3,258,986
SHIFT SELECTOR MECHANISM FOR MANUALLY CONTROLLED TRANSMISSION MECHANISM
Victor N. Phillips, Barking, Essex, and Clifford E. Smith, Hornchurch, Essex, England, assignors to Ford Motor Company, Dearborn, Mich., a corporation of Delaware
Filed Sept. 10, 1963, Ser. No. 307,875
Claims priority, application Great Britain, Sept. 11, 1962, 34,609/62
10 Claims. (Cl. 74—476)

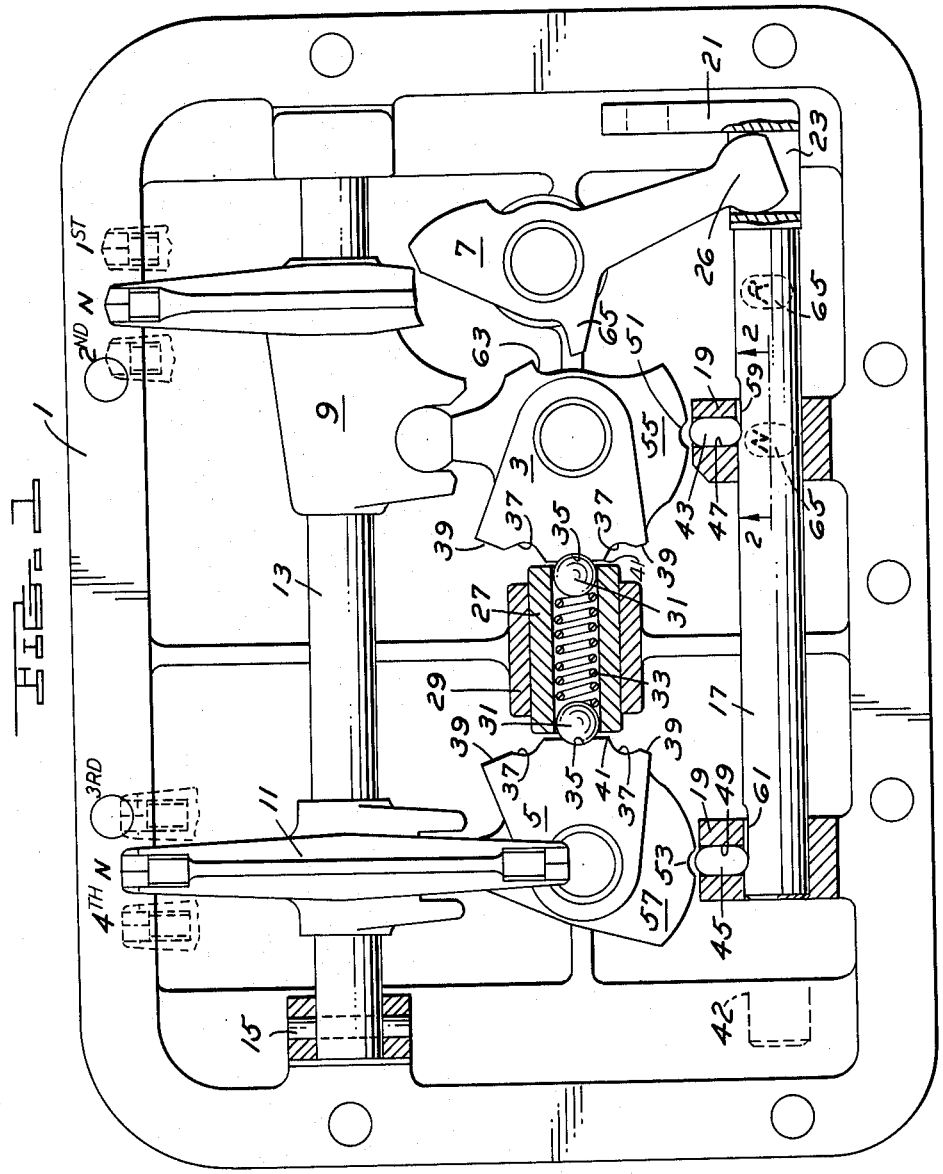
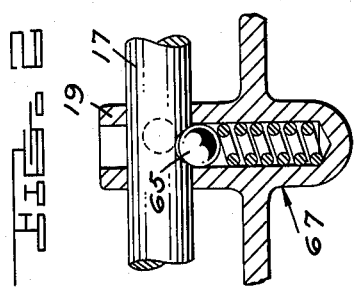
VICTOR N. PHILLIPS
CLIFFORD E. SMITH
INVENTORS
BY John R. Faulkner
Robert E. McCollum
ATTORNEYS United States Patent Office
3,258,986
Patented July 5, 1966

This invention relates to a transmission gear ratio change control mechanism.

In motor vehicles having a steering column mounted gear ratio change lever for a four-speed transmission, for example, there are usually three gear ratio selector levers (hereinafter referred to as shift levers) at the lower end of the steering column that are individually rotated by the steering column mounted lever to select a particular speed range, such as first, second, third, fourth or reverse. The three shift levers are generally connected by links to three gear ratio change rods (hereinafter called gear shift rods), each of which have a shift fork type of connection to the slidable sleeve of a clutch synchronizer. The synchronizer usually is rotatable with the transmission output shaft. Rotative movement of any one of the shift levers moves the corresponding shift rod and fork axially to engage the synchronizer with the gear to be clutched to the output shaft.

The first speed gear synchromesh assembly and reverse speed idler gear generally lie close to each other when the reverse speed range is established. It is possible, therefore, for these two to contact each other if the first gear synchronizer is moved towards engaging the first gear before the reverse idler gear has moved to its neutral position. It is known to fit an interlock between the first and the reverse gearshift members so that the former cannot be moved when the latter is in a position establishing the reverse speed range, or in a position intermediate this position and its neutral position. That is, in conventional installations, the interlock is arranged so that the first gear clutch synchronizer cannot be moved to engage first gear until the reverse idler gear has moved fully to its neutral position. This type of interlock requires close tolerances in the manufacture of the connecting links, for if one of the links is not of the exact length required, the shift rod may not be in a position placing the reverse or other gears completely in a neutral position even though the shift lever position, as indicated by the operator lever, is in a position to engage another shift lever.

More specifically, the operator's selector lever on the steering column usually is connected to the three rotatable gear-shift levers by a longitudinally and rotatably movable rod. The levers may be stacked side-by-side at the end of the steering column, and at right angles to the longitudinal movement of the column. Each lever has a key hole-like slot in which a pin mounted transversely of the steering column rod can enter, and the pin is of a thickness comparable to that of each lever so that only one lever is engaged at any one time. The neutral rotative position of the levers, that is, the position in which the gear or clutch synchronizer with which each lever is associated is in a neutral position, angularly locates the slot in a predetermined position so that when, and only when, all three levers are in their neutral positions, the slots are aligned. The steering column rod can then be moved longitudinally into or out of engagement with any one of them. However, once a lever is rotated, by rotation of the pin engaged with it, the slot in that particular lever becomes misaligned with the other lever slots, and the only way in which the steering column rod pin can be withdrawn is to rotate the lever with which it is engaged back to the neutral position.

A small clearance usually exists between the slot and pin to permit ease of engagement and disengagement between the two. As a result, if the slots are only slightly misaligned, it may still be possible to disengage the pin from one slot and engage it with another. However, if the lengths of the links connecting the shift levers to the shift rods, such as for example, the shift rod moving the reverse idler gear, are not quite correct, this slight misalignment may cause the shift rod to be in a position whereby the reverse idler gear has not moved completely to its neutral position. The interlock between the reverse idler gearshift rod and the first speed shift rod, for example, then would still be effective to prevent movement of the first speed shift lever, even though the steering column rod pin position indicates a change can be made. An erroneous impression will therefore be given that the gears are jammed.

This invention prevents the above situations from occurring by permitting greater tolerances in the lengths of the links connecting the levers to the shift rod members.

In an illustrative gear ratio change control mechanism constructed according to the invention, one shift member is movable between a gear engaged position and a neutral position, while a second shift member is movable between another gear engaged position and a neutral position. The first shift member, when moved towards its neutral position, is adapted to engage the second shift member, when the latter is between its engaged and neutral positions, to move it into its neutral position.

When the invention is used in connection with a manually controlled four-speed transmission of the type described above, the first shift member advantageously controls the first and second speed gear engagements, while the second shift member controls the engagement of the reverse idler gear. The interlock between the two shift members, constructed according to the invention, becomes inoperative immediately upon the reverse idler gear becoming disengaged, and movement of the first shift member moves, if necessary, the second shift member to its neutral position, thereby preventing contact between the first gear synchromesh assembly and the reverse idler gear. Since the interlock becomes inoperative as soon as the reverse idler gear is disengaged, it is therefore possible to move the first shift member to engage a gear before the reverse idler gear has completely reached its neutral position. This reduces the precise requirements of accuracy of adjustment of the lengths of the connecting links and rods.

The invention may also be described as a gear ratio selector mechanism in which first and second gear ratio change members are each movable to first and second gear enagaged positions and a neutral position; a reverse gear ratio shift member is movable between a reverse speed establishing position and a neutral position; and the first and second member, when being moved towards one of its gear engaged positions, engages the reverse speed establishing member, when the latter member is between the reverse speed position and neutral position, to move it into the neutral position.

Preferably, the first and second gear ratio selecting member is a lever engaging a shift fork slidable along a shift rod to engage the first and second speed gears. The reverse gear ratio establishing member is a lever engaging a reverse idler gear to slide it axially between the reverse speed establishing and neutral positions. There is also an interlock between the reverse gearshift member and the first and second speed shift lever which is operative to prevent movement of the latter from its neutral position when reverse speed is established, and which is disengaged when the reverse gearshift member is moved clear of the reverse speed gear engaged position and before the reverse gearshift member reaches the neutral position.

Advantageously, the interlock comprises a detent which is forced by the reverse gearshift member into engagement with the first and second gearshift member when the former is in the reverse gear engaged position; and which, when it is clear of the reverse gear engaged position, enters an elongated recess in the shift member to permit movement of the first and second speed gearshift member.

It is therefore an object of the invention to provide a gearshift control mechanism that permits relative movements between gearshift levers prior to one of the levers reaching its neutral position.

It is a further object of the invention to provide a gearshift control mechanism that causes a gearshift member to be moved to its neutral position upon movement of another gearshift member.

It is a still further object of the invention to provide a gearshift control mechanism having an interlock between gearshift members preventing movement of one of said members when the other is in an operative position, and including other means operable upon movement of the one member, when the other member has just left its operative position, to move the other member to its neutral position.

Other objects, features and advantages of the invention will become apparent upon reference to the succeeding detailed description thereof, and to the drawings illustrating the preferred embodiment thereof; wherein, FIGURE 1 is a view, partly in section, of the inner side of a transmission gearbox side cover on which is mounted a gear selecting mechanism constructed according to the invention; and, FIGURE 2 is a cross-sectional view taken on a plane, indicated by and viewed in the direction of the arrows 2—2 of FIGURE 1.

The gearshift selecting mechanism shown in the drawing is for a fully synchronized forward speed transmission having four forward gears and one reverse gear. The mechanism is mounted on the inner side of the side cover 1 of the gearbox.

The selector mechanism includes a first-to-second gearshift lever 3; a third-to-fourth gearshift lever 5; and a reverse gearshift lever 7, all of which are rotatably mounted in the cover 1. The levers 3 and 5 respectively engage a first-to-second gearshift fork 9, and a third-to-fourth gearshift fork 11. Both shift forks are slidable on a shift rod 13 nonrotatably fixed by a pin 15 in the cover 1. The shift fork 9 engages the sleeve of a clutch synchronizer to move it from the neutral position (indicated in full lines) either to the right or left to the dotted line positions. This engages the first or second speed gear, as the case may be, with the output shaft, to which the synchronizer is splined. The shift fork 11 similarly moves a clutch synchronizer sleeve to the right or left from the neutral position indicated, to the dotted line positions to engage the third or fourth speed gears with the output shaft. These details are not shown since they are known, and are believed to be unnecessary for an understanding of the invention.

Clockwise or counterclockwise rotation of levers 3 and 5 therefore shifts the forks 9 and 11 axially on the rod 13 to the selected positions establishing the gear ratios desired. A reverse shift fork connected detent rod 17 is axially slidable in journal bearings 19 integral with the cover 1, and has a reverse gearshift fork 21 integral with its right-hand end. The rod 17 has a recess 23 engaged by the ball-like end 26 of lever 7. The levers 3, 5 and 7 are respectively connected by external links (not shown) in a known manner to the selectively rotated gearshift levers at the lower end of a motor vehicle steering column.

An interlock is fitted between the levers 3 and 5 to prevent movement of one of the levers from the neutral position shown when the other lever moves its associated shift fork towards a gear engaged position. The interlock comprises a sleeve 27 axially slidably mounted in a boss 29 integral with the cover 1, and two balls 31 forced apart by a spring 33. Each of the levers 3 and 5 has central recesses 35, side recesses 37, and cam surfaces 39. When one of the levers, for example lever 3, is rotated from the neutral position shown, the shoulder 41 between recesses 35 and 37 forces the right-hand ball 31 inwardly against the spring 33. Continued rotation of the lever then causes the cam surface 39 to engage the edge of sleeve 27 and force it axially to the left to abut the shoulder 41 adjacent the center recess 35 of lever 5. The lever 5 is therefore prevented from rotating from its neutral position. A similar action occurs on the part of the lever 5 when it is rotated while lever 3 is in a neutral position.

Lever 7, when it is rotated clockwise, slides the rod 17 to the left. The reverse gearshift fork 21, which is connected to a reverse idler gear (not shown), then slides the idler gear into mesh with gear teeth on the exterior of the first gear synchromesh assembly (not shown).

An interlock between the rod 17 and the levers 3 and 5 is operative to prevent movement of the levers 3 and 5 from their neutral position when the rod 17 is in the reverse gear engaged position (i.e., the left-hand dotted position 42). Conversely, reverse gear can not be established when the lever 3 or 5 is out of its neutral position. The interlock comprises elongated detents 43 and 45 slidably mounted in bores 47 and 49 in the bosses 19. The detents in one position engage recesses 51 and 53 in cam members 55 and 57 fixed respectively to levers 3 and 5, thus preventing rotation of these levers from their neutral positions. In their alternate positions, the detents engage the bases of a pair of elongated recesses 59 and 61 provided in rod 17. The lengths of the detents 43 and 45 are less than the distance from the bases of the recesses 59 and 61 to the peripheries of cam portions 55 and 57, so that when engaged with the rod recesses, the detents permit rotation of the levers 3 and 5.

When the rod 17 is slid to the left sufficiently to position the recesses beyond the detents, the unreduced portion of rod 17 forces the detents 43 and 45 axially out of the recesses 59 and 61 into recesses 51 and 53 in the cam portions 55 and 57, and so prevents rocking of the levers 3 and 5. This occurs before the rod 17 reaches the reverse gear engaged position 42. Conversely, the lengths of the recesses 59 and 61 are such that just after the idler gear (not shown) is moved clear of the teeth on the first gear synchromesh assembly by return movement of the rod 17 to the right, the detents 43 and 45 slide back into engagement with the bases of the recesses 59 and 61 so that the levers 3 and 5 can be rotated as soon as reverse gear is disengaged, and before the rod 17 reaches its neutral position shown.

As described previously, if lever 3 were now rotated clockwise to engage the first speed gear, the first gear synchromesh assembly might engage the reverse idler gear, since it has just moved from its reverse gear engaged position. To prevent this, the lever 3 has an abutment 63 which engages an abutment 65 on the reverse gear lever 7 when the rod 17 is in an intermediate position and the lever 3 is being rotated clockwise to engage first gear. The engagement of the abutments then forces the reverse gear lever 7 in a counterclockwise direction, and therefore moves the rod 17 to its neutral position shown. In this position, the idler gear (not shown) is completely clear of the first gear synchromesh assembly when first gear is engaged.

The engagement of second, third or fourth gears, after the rod 17 has been moved to the right sufficiently for the detents 43 and 45 to enter the recesses 59 and 61 involves no risk of the synchromesh assemblies (not shown) associated with these gears contacting the idler gear, and consequently no damage results if the detent rod 17 is initially in the intermediate position.

The rod 17 is also provided with recesses 66 cooperating with spring loaded detents 67 to locate it either in its reverse gear position R or neutral position N.

While the invention has been illustrated in its preferred embodiment in the figures, it will be clear to those skilled in the arts to which the invention pertains, that many changes and modifications may be made thereto without departing from the scope of the invention.

What is claimed is:

1. A gear ratio change control mechanism comprising, in combination, spaced first and second rotatable gear ratio selector levers each rotatable independently of the other between a gear engaged position and a gear disengaged neutral position, gearshifting means engaged by said first lever for movement thereby, and means between said levers effective when said first lever is between its positions for moving said gearshifting means and said first lever to its neutral position upon movement of said second lever to its gear engaging position.

2. A gear ratio change control mechanism comprising spaced first and second rotatable gear ratio selector levers each rotatable independently of the other between a gear engaged position and a gear disengaged neutral position, gearshifting means engaged by said first lever for movement thereby, and cam means on each of said levers engageable with each other upon movement of said second lever towards its gear engaging position when said first lever is between its positions, for moving said gearshifting means and said first lever to its neutral position.

3. A gear ratio change control mechanism comprising spaced first and second rotatable gear ratio selector levers each rotatable between gear engaged and gear disengaged neutral positions, gearshifting means engaged by the first of said levers for movement thereby, first coacting means between said gearshifting means and said second lever preventing movement of said second lever to a gear engaging position when said first lever is in a gear engaged position, and other coacting means between said levers for moving said gearshifting means and said first lever towards its neutral position by said second lever upon movement of said second lever towards its gear engaging position.

4. A gear ratio change control mechanism comprising spaced first and second rotatable gear ratio selector levers each rotatable between gear engaging and gear disengaged neutral positions, a rod having gearshifting means secured thereto and engaged by the first of said levers for movement thereby, first movable coacting means between said rod and said second lever locking said second lever against movement when said first lever and rod are in a gear engaged position and permitting relative movement between said levers immediately subsequent to movement of said first lever from its gear engaged position, and other coacting means between said levers for effecting movement of said rod and said first lever towards its neutral position by said second lever upon movement of said second lever towards its gear engaging position.

5. A gear ratio change control mechanism comprising spaced first and second rotatable gear ratio selector levers each rotatable between a gear engaged and gear disengaged neutral position, a rod having gearshifting means secured thereto and engaged by the first of said levers for movement thereby, detent means between said rod and said second lever preventing movement of said second lever to a gear engaging position when said first lever and rod are in a gear engaged position, and coacting means between said levers for effecting movement of said rod and said first lever towards its neutral position upon movement of said second lever towards its gear engaging position, said detent means including a reciprocable locking member movable into and out of locking engagement with said second lever, and means on said rod permitting the lever unlocking movement of said member including an elongated recess receiving said member after initial movement of said first lever from its gear engaged position.

6. A gear ratio change control mechanism comprising spaced first and second rotatable gear ratio selector levers each rotatable between a gear engaged and gear disengaged neutral position, a rod having gearshifting means secured thereto and engaged by the first of said levers for movement thereby, detent means between said rod and said second lever preventing movement of said second lever to a gear engaging position when said first lever and rod are in a gear engaged position, and coacting means between said levers for effecting movement of said rod and said first lever towards its neutral position by said second lever upon movement of said second lever towards its gear engaging position, said detent means including a reciprocable locking member between said rod and second lever movable alternately into and out of locking engagement with said second lever to control its rotative movement, said rod having a recess elongated in the direction of movement of said rod for receiving said member during its unlocking movement, the elongation of said recess permitting movement of said member to its lever unlocking position upon movement of said first lever from its gear engaged position.

7. A gear ratio change control mechanism comprising spaced first and second rotatable gear ratio selector levers each rotatable between a gear engaged and gear disengaged neutral position, a rod having gearshifting means secured thereto and engaged by the first of said levers for movement thereby, detent means between said rod and said second lever preventing movement of said second lever to a gear engaging position when said first lever and rod are in a gear engaged position, and coacting means between said levers for effecting movement of said rod and said first lever towards its neutral position by said second lever upon movement of said second lever towards its gear engaging position, said detent means including a reciprocable locking member between said rod and second lever movable alternately into and out of locking engagement with said second lever to control its rotative movement, said rod having a recess elongated in the direction of movement of said rod for receiving said member during its unlocking movement, the elongation of said recess permitting movement of said member to its lever unlocking position after movement of said first lever from its gear engaged position and prior to its movement to its neutral position.

8. A gear ratio change control mechanism comprising spaced first and second rotatable gear ratio selector levers each rotatable between a gear engaged and gear disengaged neutral position, a rod having gearshifting means secured thereto and engaged by the first of said levers for movement thereby, detent means between said rod and said second lever preventing movement of said second lever to a gear engaging position when said first lever and rod are in a gear engaged position, and cam means on each of said levers engageable upon movement of said second lever towards its gear engaging position for effecting movement of said rod and said first lever towards its neutral position by said second lever, said detent means including a reciprocable locking member between said rod and second lever movable alternately into and out of locking engagement with said second lever to control its rotative movement, said rod having a recess elongated in the direction of movement of said rod for receiving said member during its unlocking movement, the elongation of said recess permitting movement of said member to its lever unlocking position after movement of said first lever from its gear engaged position and prior to its movement to its neutral position.

9. A gear ratio control mechanism comprising, in combination, spaced first and second rotatable gear ratio selecting levers each rotatable independently of the other between a gear ratio established position and a gear ratio disestablishing neutral position, gear ratio change means engaged by each of said levers for movement thereby, and means between said levers effective when one of said levers is between its positions for moving said gear ratio change means and said one lever to its neutral position upon movement of the other of said levers to its gear ratio establishing position.

10. A gear ratio change control mechanism comprising, spaced first and second rotatable gear ratio selector levers each rotatable independently of the other between a gear engaged position and a gear disengaged neutral position, gear ratio change means engaged by said levers for movement thereby, and cam means on each of said levers engageable with each other upon movement of one of said levers towards its gear engaging position when the other of said levers is between its positions, for moving said gear ratio change means and said other lever to its neutral position.

References Cited by the Examiner
UNITED STATES PATENTS 2,470,274    5/1949    Wahlberg _____ 74—477
3,040,595    6/1962    Osswald _____ 74—476 X MILTON KAUFMAN, *Primary Examiner.*